US011151646B1

(12) United States Patent
Simon

(10) Patent No.: US 11,151,646 B1
(45) Date of Patent: *Oct. 19, 2021

(54) INTEGRATING AN EXTERNALLY-SUPPLIED INTERFACE COMPONENT INTO A TRANSACTION PLATFORM

(71) Applicant: Lon Operations LLC, New York, NY (US)

(72) Inventor: Daniel Simon, New York, NY (US)

(73) Assignee: LON OPERATIONS, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,663

(22) Filed: Aug. 6, 2019

Related U.S. Application Data

(63) Continuation of application No. 15/151,556, filed on May 11, 2016, now Pat. No. 10,417,706.

(60) Provisional application No. 62/160,134, filed on May 12, 2015.

(51) Int. Cl.
| | |
|---|---|
| *G06Q 40/02* | (2012.01) |
| *G06F 3/0481* | (2013.01) |
| *G06Q 30/06* | (2012.01) |
| *G06F 3/0484* | (2013.01) |
| *G06Q 20/12* | (2012.01) |
| *G06F 40/174* | (2020.01) |

(52) U.S. Cl.
CPC ....... *G06Q 40/025* (2013.01); *G06F 3/04817* (2013.01); *G06F 3/04842* (2013.01); *G06Q 30/0643* (2013.01); *G06F 40/174* (2020.01); *G06Q 20/12* (2013.01)

(58) Field of Classification Search
None
See application file for complete search history.

(56) References Cited

U.S. PATENT DOCUMENTS

| | | | |
|---|---|---|---|
| 2013/0117185 A1 | 5/2013 | Collison et al. | |
| 2013/0117647 A1 | 5/2013 | WeissMalik | |
| 2014/0032392 A1* | 1/2014 | Ansari | G06Q 40/02 705/38 |
| 2014/0149294 A1 | 5/2014 | Leevendig et al. | |
| 2014/0365341 A1 | 12/2014 | MacLaurin et al. | |
| 2015/0178809 A1 | 6/2015 | Scopazzi | |

(Continued)

OTHER PUBLICATIONS

Managing Your Money for Windows to Debut "Smart Desk" GUI, Newsbytes Mar. 21, 1994, 7 pages.

*Primary Examiner* — Joseph W. King
*Assistant Examiner* — Amit Patel
(74) *Attorney, Agent, or Firm* — Lowenstein Sandler LLP

(57) ABSTRACT

A system and method relating to providing a program executable via an icon provided in one or more pages displayed by a user interface displaying content associated with an item available for purchase via a transaction platform associated with a merchant. In response to an interaction with the icon, a first form is generated in the user interface to collect data associated with a loan application associated with a transaction corresponding to the item. In response to receiving a submission of the data associated with the loan application, a determination is made to approve a loan associated with the item. A token including an identifier corresponding to the loan and the transaction is generated, such that the token can be processed to enable completion of the transaction.

17 Claims, 14 Drawing Sheets

(56) References Cited

U.S. PATENT DOCUMENTS

| | | |
|---|---|---|
| 2015/0242885 A1 | 8/2015 | Alsina et al. |
| 2015/0324592 A1 | 11/2015 | Dutta |
| 2016/0048822 A1* | 2/2016 | Forrest .................. G06Q 20/12 705/26.81 |
| 2016/0071206 A1 | 3/2016 | Danieli |
| 2016/0171600 A1* | 6/2016 | Kay ..................... G06F 40/186 705/38 |
| 2016/0314529 A1 | 10/2016 | Dolle |
| 2016/0321726 A1 | 11/2016 | Singh et al. |

* cited by examiner

INTEGRATING AN EXTERNALLY-SUPPLIED INTERFACE COMPONENT INTO A TRANSACTION PLATFORM

CROSS-REFERENCE TO RELATED APPLICATIONS

This is a continuation of U.S. patent application Ser. No. 15/151,556 filed on May 11, 2016, titled "Integrating Externally-Supplied Interface Component into Transaction Platform", which in turn claims priority to U.S. Provisional Application No. 62/160,134 filed on May 12, 2015, titled "System and Method to Provide Installment Payment for Online Shopping". The contents of U.S. patent application Ser. No. 15/151,556 and U.S. Provisional Application No. 62/160,134 are hereby incorporated by reference in their entireties herein.

TECHNICAL FIELD

This disclosure relates to a computer-implemented platform for transactions, and in particular, to systems and methods to incorporate an interface component provided by a third party into the computer-implemented transaction platform.

BACKGROUND

Online shopping has become a common shopping mode for consumers. Typically, a merchant may provide a website hosted on a transaction platform to enable the consumers to purchase merchandise using an available payment method (e.g., using credit cards or gift cards). The payment method is commonly a native part of the transaction platform. When making significant online purchases (such as furniture, home appliances, consumer electronics, or any suitable good or services), a consumer may lack the financial means to afford those purchases at the time of purchase. For example, the consumer may not have enough money or a credit line in his or her credit card to make the intended purchase. Currently, their options include applying for the store's white label credit card on the transaction platform. The store brand credit cards may carry an unfavorable annual percentage rate (APR) and terms. Alternatively, the consumer can use an online revolving credit product like Bill Me Later™, which suffers from the same issues as white label credit cards.

BRIEF DESCRIPTION OF THE DRAWINGS

The present disclosure is illustrated by way of example, and not by way of limitation, in the figures of the accompanying drawings.

FIGS. 2A-2J show a series of online store UIs according to some implementations of the present disclosure.

DETAILED DESCRIPTION

Figure 1:
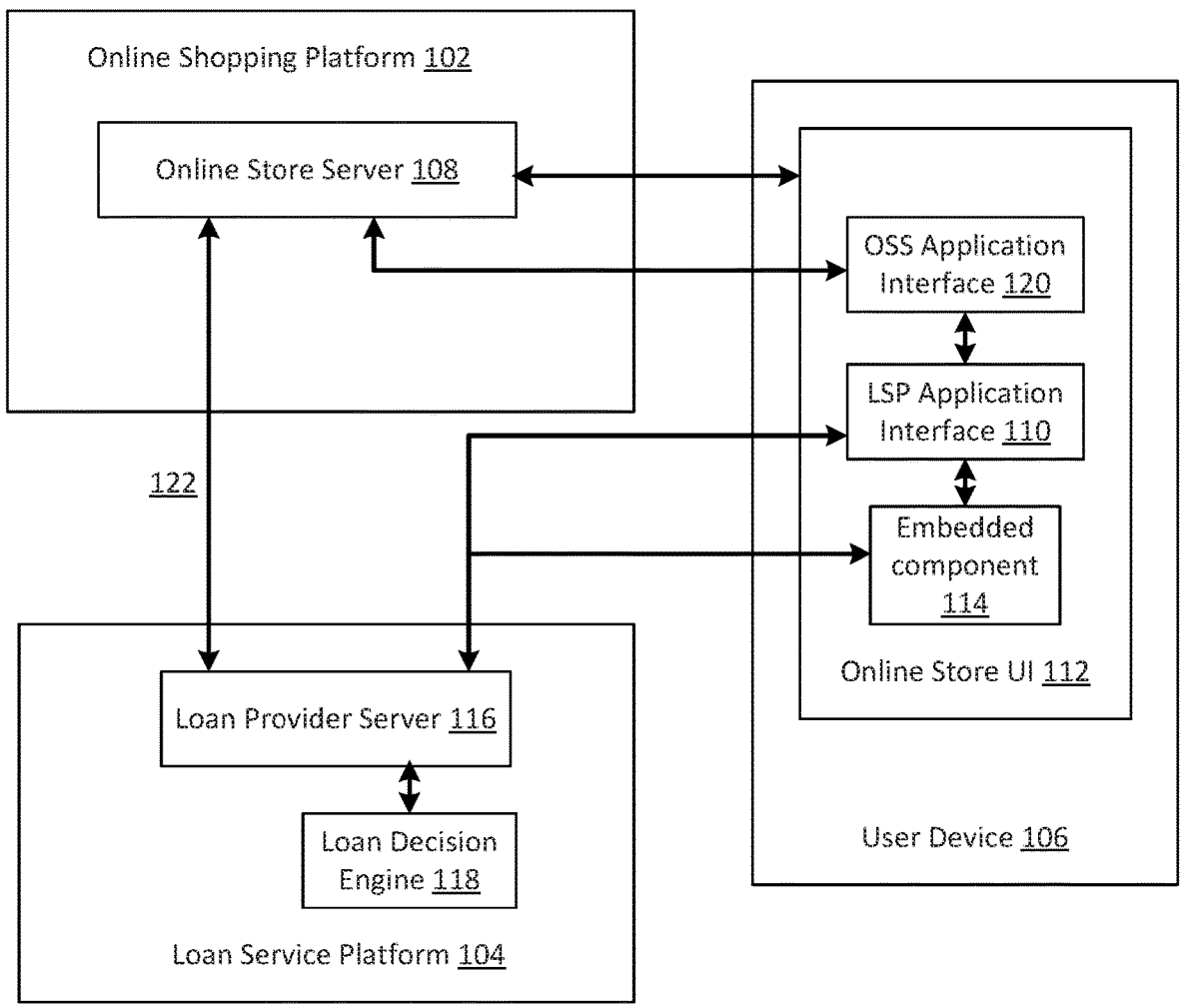
FIG. 1 shows a system that integrates an externally-supplied interface component into an online store user interface according to an implementation of the present disclosure.

Implementations of the present disclosure provide a transaction platform hosted on a server computer of a merchant. The transaction platform may provide an online store to a user device using an online store user interface (UI) in which a third-party computer platform associated with a loan provider may supply a software program. The online store UI can be a web browser, an App, or any suitable forms of content-presenting application running on a user device. The software program may include an embedded component integrated into the online store UI. The embedded component may be associated with a graphic user interface (GUI) element (e.g., an inline frame (iframe) element or a pop-up element) through which a consumer may acquire installment loans to pay for his or her purchase at the merchant's online store. In another implementation, the embedded component can be an application programming interface (API) function call that can be invoked by the online store of the merchant without displaying the embedded element through a GUI element. Implementations of the present disclosure provide a technical solution that conveniently supplies loan terms to user devices and enables consumers to acquire loans for online purchases in real time.

The software program running on the loan provider server may be seamlessly integrated into the transaction platform via the embedded component. For example, the embedded component may be associated with a visual icon that is integrated into an online store user interface (UI) of the transaction platform. The visual icon can be a graphic representation that can be rendered on a display screen, whereas the visual icon may present concise information to a user. In one implementation, the visual icon may be provided by the loan provider server embedded in an inline frame element or a pop-up element. In another implementation, the visual icon may be provided by the online store server as a graphic element of the online store UI. In the context of the loan application, the concise information may be related to the availability of finance, the interest rate of a loan, or monthly payment and terms of a loan. The visual icon may be activated by a user engaging an input device (e.g., a mouse or a touch screen) on the visual icon. The activation of the visual icon may transmit an electronic signal to the loan provider server indicating a selection by the user. The engagement by the input device may include clicking on the visual icon or hovering over the visual icon on a touch screen. The visual icon can be placed at suitable locations on the online store UI based on the context information presented at the online store. For example, a clickable button can be placed on product detail pages, on shopping cart overview pages, or as a payment method on a checkout page. Further, the button can be blended into the look and feel of the merchant's online store UI, and the button may display a message derived from the context information.

Context information may be related to the item or items in scope currently presented on the online store UI (e.g., a web browser or an App on a mobile device). For example, the context information can be the product being marketed on a product details page, its price and stock keeping unit (SKU) number, and other product-related information. The context information may also be related to the user's shopping session, such as products in the user's electronic shopping cart, billing and shipping contact information if already provided by the user, or discounts to be applied by the merchant to the shopping quote, etc. The context may change from page to page as the user navigates the merchant's online store. The message derived from the context information may change in accordance with the context in which the graphical representation is provided.

When a consumer browsing the online store UI of a merchant chooses to pay for a purchase using the financing option (e.g., an unsecured loan) provided by the third-party and activates the visual icon indicating the financing option, implementations of the present disclosure may execute the embedded component to generate a loan application form presented over the online store UI. The loan application form may be provided as an HTML inline frame (iframe) element or a pop-up element that takes over the consumer's view without redirecting the online UI's URL address bar off of the merchant's online store UI. The consumer may enter requisite information such as, for example, personal information about his/her identity in the loan application form. The entered personal information may be transmitted by the embedded component (e.g., a JavaScript program) of the software program using either a push method or a pull method to a computer server associated with a loan provider. In real time, the loan provider may use the consumer's personal information data to locate the consumer's credit information that is available to the loan provider or from third-party sources, and make a loan decision in a real time (e.g., in seconds). The decision may determine whether, at what interest rate, and for what dollar amount the loan provider can underwrite the loan for this consumer's purchase. If the loan application is approved and the purchase is successfully underwritten by the loan provider, a term sheet including a payment plan is generated and displayed to the consumer, whereas the term sheet may include a payment per month, a length of loan term in months, and an annual percentage rate (APR).

The consumer can learn immediately of the loan terms directly from the loan provider bypassing the merchant. In one implementation, certain aspects (e.g., as an approximate monthly payment over a pre-determined number of months) of the loan terms may be displayed on the visual icon. If the consumer is at a shopping stage at which the merchant has not collected personal information about the customer's preferred shipping address and method, the embedded component integrated with the merchant's online store may collect that information on behalf of the merchant and calculate the payments taking into consideration the shipping and tax costs.

Once the consumer confirms the purchase via the embedded component integrated in the online store UI, the software program running on the loan provider server may generate and transmit a transaction token back to the online store server. The merchant may associate the transaction token with the purchase order transacted with the loan and store the token in association with the purchase order. The merchant may use the token in future proceedings with the loan provider to identify the transaction. The future proceedings may include payment transactions and refund operations. In one implementation, the software program may transmit the transaction token directly to the online store server. In another implementation, the software program may transmit the transaction token via the embedded component integrated in the online store UI.

The transaction token may include a randomly-generated alphanumerical string of certain length that uniquely identifies the transaction. The transaction token is a substitute for sensitive data (e.g., credit card numbers or social security numbers) that serve as an identifier of transactions. Because the transaction token is randomly-generated by a token generator, the transaction token cannot be reversed back to the sensitive data by a malicious attacker. Instead, sensitive data such as personal information data are stored in a secured vault maintained by the loan provider or a third-party token provider, thus saving the merchant from the burden to maintain the sensitive data of the consumer. To secure consumer's personal identification information (PII), in one implementation of the present disclosure, all communication relating to the PII may be encrypted and transferred directly between the online store UI (e.g., a user's web browser or an App running on a mobile device) and the loan provider server. The online store server does not store the PII. Thus, the responsibility of safeguarding the sensitive data is with the loan provider server.

Thus, the loan provider server may exchange transaction information using the transaction token without the need to use the sensitive data to identify the transaction. For example, the online store server is able to interact with the loan provider server using the transaction token to perform authorization, cancellation, settlement, and refund. Authorization is a request by the merchant for confirmation from the loan provider that there is a guarantee of funding for an order upon the merchant's fulfillment of the order. A successful authorization of the order indicates to the merchant that it can proceed with the order fulfillment and shipping since it is guaranteed with payment. An authorization may fail if, for instance, the requested transaction price exceeds the maximum amount of loan that the consumer is pre-qualified. Settlement is an instruction by the merchant to the loan provider requesting to fund an authorized transaction. A successful settlement results in the loan provider to remit funds for the order to the merchant within a contractually-stipulated period of time. Cancellation is an instruction by the merchant to reduce or nullify the amount of an authorized transaction. Refund is an instruction by the merchant to credit the customer for all or part of the amount of a settled transaction. A successful refund may result in a reduced loan balance (or owed amount) by the customer. The merchant may ultimately credit the loan provider the refunded amount. A refund may happen if the customer returns the purchased merchandise to the merchant in accordance with the merchant's return policy. Cancellations and refunds can be partial or for the total order value. Once the merchant fulfills the customer's order and requests settlement using a settlement user interface provided by the loan provider or using a settlement API provided by the loan provider, the loan provider may guarantee payment in full to the merchant from the proceeds of a loan written to the consumer.

In one implementation, the online store may include a variety of pages (e.g., web pages) corresponding to different stages of the online shopping. The pages may include a product detail page, a purchase page, and a checkout page. These pages may be static pages or dynamically-generated pages. The content in these pages may provide a context of the online shopping. The visual icon associated with the embedded component may be presented on the different stages of the online shopping while the message displayed on the visual icon may change based on the context information. In one implementation, the visual icon may present information that is context-aware based on the content in the page on which the visual icon is provided for. For example, if the visual icon is placed on a product detail page, the monthly payment presented on the visual icon is based on the total price of that product presented on the product detail page. If the consumer is at the cart overview or the checkout page, the monthly payment presented is based on a loan to purchase all items in the cart on the checkout page. A session is a semi-permanent interactive information interchange (also referred to as a dialogue, a conversation, or a meeting) between two or more communicating devices. A user device may use cookies and cryptographic techniques to record certain states of the session. When providing dynamic content to the online store UI on the user device, the server (e.g., the loan provider server) may send the state data to the online store UI in the form of a cookie. The online store UI may store the cookie in a data store of the user device. For each subsequent request, the online store UI sends the cookie back to the server. The server may use the data to retrieve the state of the application for the online store UI and generate a response accordingly.

In the event that the consumer previously applied for and received an approval for a certain loan amount through the loan provider server, the visual icon may present the monthly payment at the online store UIs on which the consumer encounters the visual icon. For a customer who had been previously qualified for a certain amount of loan through a loan application session, the embedded component may identify the customer through the use of cookies stored on the customer's device. These cookies may contain a unique session identifier associated with the session that has been saved on loan provider server. For security reasons, these cookies are accessible by the embedded component of the software application provided by the loan provider server but not by the online store server of the merchant or by the online store application interface. Responsive to the customer visiting a particular online store UI supplied by the online store server, the embedded component may extract and transmit information stored in the cookies to the loan provider server that may identify the related session. The loan provider server may determine, based on the information in the session, that the customer is previously qualified for a certain amount of loan under a certain term. The monthly payment is determined based on the rate set by the loan provider according to the consumer's credit risk profile. This allows the consumer to consider purchases in the context of his or her budget.

FIG. 1 shows a system 100 that integrates an externally-supplied interface component into an online store user interface according to implementations of the present disclosure. The online shopping environment can be an online shopping platform such as, for example, a web-based online store platform or an App-based mobile shopping platform. As shown in FIG. 1, the system 100 may include an online shopping platform 102, a loan service platform 104, and a user device 106 that may be connected via communication networks (not shown) based on communication protocols such as, for example, Internet protocol (IP) or a wireless network protocol. The online shopping platform 102 may include a processing device (such as hardware processors) (not shown) to execute an online store server application 108. The online store server 108 may perform various functions of an online store. For example, the online store server 108 may include a web server that generates and serves pages including contents at various stages of the online shopping experience and execute programs to perform different functions relating to a purchase transaction. The functions performed by the online store server 108 may also include inventory management, purchase order processing, and delivery. Further, the online store server 108 may provide an online store server (OSS) application interface 120 (such as JavaScript code) in an online store UI 112 presented on the user device 106. Application interface 120 may communicate with third-party programs embedded (e.g., loan service provider (LSP) application interface 110 provided by the loan service provider (LSP)) within the online store UI 112. Application interface 120 may provide a communication channel to exchange data between online store UI 112 and embedded component 114.

The user device 106 may be any type of device that can receive and display contents in online store UI 112 served by the online store server 108. For example, user device 106 can be a desktop computer, a tablet computer, or a mobile phone such as, for example, a smart phone. User device 106 may include a processing device (such as a hardware processor) (not shown) to execute machine-executable codes of various software applications. In one implementation, the processing device may execute an online store UI 112 that may present contents served by the online store server 108 to a consumer. In one implementation, the online store UI 112 may be a web browser that receives and displays the pages served by the online store server 108. In another implementation, the online store UI 112 may be a shopping App executed on a smart phone that receives and displays the contents customized for mobile devices and served by the online store server 108. A consumer may use the online store UI 112 to access the online store, shop for merchandise, and make a purchase.

In one implementation, in addition to providing the content for the consumer to complete a purchase, the online shopping platform 102 may also allow a loan service provider to provide a loan option integrated in the online store UI. The loan option may allow the consumer to pay for a purchase through a series of installment payments. In one implementation, the loan service provider may be an external entity that is separate from the online store and provides the loan option by integrating an embedded software component in one or more of the content pages supplied by online store server 108.

As shown in FIG. 1, the loan service provider may provide the loan service to the online store and its customer through the loan service platform 104. The loan service platform 104 may include a processing device such as, a hardware processor, (not shown) to execute executable code of software programs. In one implementation, the processing device of the loan service platform 104 may execute a loan provider server 116 that may communicate with the user device 106 to provide an embedded component 114 in the online store UI 112. Embedded component 114 may include program code that is integrated into online store UI 112. In one implementation, embedded component 114 may communicate with the online store interface 120 via an application interface 110 provided by the loan service provider (LSP). The application interface 110 can be an embedded program (e.g., a JavaScript import) that is communicatively coupled to LSP application interface 110 and then OSS application interface 120 to provide a communication channel between the embedded component 114 and the online store interface 120. Application interface 110 may provide instructions to place embedded component 114 into online store UI 112, including instructions to modify the document structure of online store UI 112 to include embedded component 114. Because embedded component 114 collects and displays sensitive consumer information, the embedded component is loaded in a secured context (such as an inline frame) that is separate from online store interface 120 and application interface 110. Embedded component 114 may communicate with application interface 110 using a secure messaging mechanism, such as HTML5 postMessage. The communication is secure in the sense that the communication is a point-to-point message exchange that does not involve the online store server 108.

In one implementation, the loan provider server 116 may be associated with a loan service provider that is a separate and independent entity from the online store server 108 of the merchant. As an external loan service provider, the independent loan provider server 116 may provide the embedded component 114 (and the associated visual icon) to one or more online store UIs 112 associated with one or more user devices 106. In one implementation, the loan provider server 116 may supply the embedded component 114 and the associated visual icon in the online store UI 122. For example, the visual icon may be displayed as a button indicating an installment payment option (e.g., "pay over time") to the consumer on the online store UI 112. The visual icon may be presented on each page served by the online store server 108 to the online store UI 112. The visual icon associated with the embedded component 114 may be displayed as a button on the product detail page and on a checkout page. In one implementation, the visual icon may include a message that is context-aware in the sense that the visual icon may present a message adaptively based on what content the consumer is currently viewing. Embedded component 114 via LSP application interface 110 may determine the current content (or context) that the consumer is viewing and transmit the context information to loan provider server 116. The loan provider server 116 may determine the information to be presented on the visual icon based on the context information and supply the message to be presented to embedded component 114. For example, the visual icon may contain the payment information with respect to a product that the consumer is viewing on a product detail page. But, the visual icon may contain the payment information with respect to a total purchase of a number of products on a checkout page.

In one implementation, embedded component 114 may be provided on the online store UI 112 as an element within a hypertext markup language inline frame (HTML iframe). For example, the loan provider server 116 may communicate with the embedded component 114, and embedded component 114 may communicate with LSP application interface 110 (which communicates with OSS application interface 120) to receive information relating to the context of the online shopping. The context information presented on online store UI 112 may be used to determine the message presented on the visual icon 114. In one implementation, the context information may include an identification of which pages are being provided to the online store UI 112, which page the consumer is currently viewing, one or more pieces of merchandise for which financing is desired, and the price(s) and stock keeping unit(s) (SKU) of the one or more pieces of merchandise.

In the event that the consumer wishes to consider purchasing the merchandise using the loan option provided from loan service platform 104, the consumer may click on the visual icon associated with embedded component 114 provided on the online store UI 112 to start the process of a loan application. When the visual icon is provided by the online store server, in response to the selection of the visual icon, the online store server may transmit a notification to OSS application interface 120 to notify the selection. OSS application interface 120 may forward the notification to LSP application 110 which may, in turn, to notify embedded component 114 about the selection of the visual icon. If the visual icon is provided by loan provider server 116, the loan provider server may receive a notification of the selection of the visual icon directly from embedded component 114. In response to detecting that the consumer has clicked the visual icon and selected the loan option for a purchase, the loan provider server 116 may, via embedded component 114, provide loan application forms to the online store UI 112. These application forms may be displayed in online store UI 112 within inline frame elements or as pop-up elements presented to the consumer. The consumer enters personal data in these forms and submits the forms to apply for a loan. Upon receiving the submission of the personal data via the filled-out application forms from embedded component 114 presented on the online store UI 112, the loan provider server 116 may generate a loan request. The loan request may include the consumer's personal information and information about the one or more items that the consumer intends to purchase with the loan. The loan provider server 116 may transmit the loan request to a loan decision engine 118 which may determine whether the consumer can receive the loan and on what terms the loan can be based.

Responsive to receiving the loan request from the loan provider server 116, the loan decision engine 118 may determine if the requested loan can be granted to the consumer. In one implementation, the loan decision engine 118 may authenticate the identity of the consumer, check the credit score of the authenticated consumer, and create a credit risk profile for the consumer. The loan decision engine 118 may store the credit risk profile of the consumer in a storage device. For example, the loan decision engine may use the personal identification information provided in the loan application form to retrieve consumer credit report information from third-party consumer credit reporting agencies. Those reports may contain historical information about a consumer's credit performance and credit-related events such as bankruptcies or foreclosures. The reports may contain credit scores that synthesize the historical credit information into a quantitative value that may indicate the likelihood that a consumer repays the loan in the future. The loan decision engine 118 may take this data as well as data from other sources, such as utility bill records, history with the loan service provider itself, information about the merchant and products related to the purchase to calculate a proprietary credit score. The loan decision engine 118 may use this credit score to make a decision. For example, a customer with a credit score below a certain threshold will not be prequalified for a loan, while those above that threshold will be prequalified. Further, the loan decision engine 118 may use this credit score to determine price and maximum loan amount. For example, customers with higher credit scores may receive a lower interest rate on their loan, and may be preapproved for loans that can be of a greater amount than would be offered to those with lower credit scores. Further, the loan decision engine 118 may make a decision of whether to approve the loan to the consumer based on the consumer's credit risk profile. If the loan decision engine 118 denies the loan application, the loan provider server 116 may also inform the consumer via the visual icon 114.

Upon receiving an approval from loan decision engine 118 for the loan to pay for the purchase, the loan provider server 116 may provide procurement service to complete the transaction as an agent for the online store server 108. For example, the loan provider server 116 may provide purchase agreement forms in the inline frame or a pop-up element to ask the consumer about shipping address and calculate the sales tax associated with the residential address of the consumer. Based on the shipping cost and sales tax, the loan provider server 116 may recalculate a monthly payment taking into consideration the shipping cost and sales tax, and provide a checkout form in the inline frame to the consumer for consummating the purchase using the loan.

The loan application process by a customer may be recorded as a session using cookies stored in the user device 106. Each step in the loan application may be recorded as a state by the cookies. By receiving the cookies from online store UI 112, loan provider server 116 may recognize the current state of the loan application. The session may also be associated with the user device for retrieving information about a pre-approved loan for a consumer.

Responsive to receiving a confirmation by the consumer to complete the transaction, the loan provider server 116 may generate, or receive from a third-party token provider, a transaction token for the confirmed sale and provide the transaction token to OSS application interface 120. As discussed before, the transaction token may include an alphanumerical string randomly generated by a token generator. The transaction token may serve as a substitute for a sensitive personal identifier (e.g., a credit card number or social security number). The mapping between the transaction token and the sensitive personal identifier may be stored in a secured vault. The transaction token may be used to identify the loan transaction by online shopping platform 102 and loan service platform 104. In one implementation, the token may uniquely identify the loan transaction. The online store server 108 is then able to interact with loan provider server 116 using this transaction token to perform authorization, cancellation, settlement, and/or refund. Online store server 108 performs these operations either using a graphical user interface tool provided by loan provider server 116, or electronically by using the separate application programming interface (API) provided by the loan provider server 116 for this purpose. When using the API, online store server 108 may make an electronic request to the API, supplying along with the request the transaction token associated with the relevant transaction, as well as electronic credentials securely authenticating the identity of the merchant. The loan provider server 116 uses the transaction token to identify the individual transaction and associated loan in the server's systems represented by the transaction token. Further, the loan provider server 116 may update the display on the visual icon 114 to inform the consumer of the completion of the purchase with the loan.

Based on the transaction token, the merchant may fulfill the transaction and request a full payment of the purchase price from the loan service provider. In one implementation, online shopping platform 102 may be communicatively coupled to loan provider server 116 via a communication channel 122 to enable loan provider server 116 to use the transaction token to perform authorization, settlement, cancellation, and/or refund operations with online store server 108.

To make an installment payment, the consumer may log into a consumer-facing website of the loan service provider by providing his or her mobile phone number. At the provided mobile phone number, the consumer may receive a one-time password (OTP) that the consumer may use to log into the website. Once logged in, the consumer may manage his or her account and pay the installment payment. For example, the consumer may check his or her outstanding loan amount associated with each merchant. Further, the website of the loan service provider also provides an option to pay the installment payment or prepayment by automatic clearing house (ACH) payment method. For example, the consumer may provide his or her bank account number and the bank routing number to enable a payment at a certain date. The consumer may also pay the loan payments by sending a check to the loan service provider, or by debiting a bank account, or by any suitable forms of payment.

Figure 5:
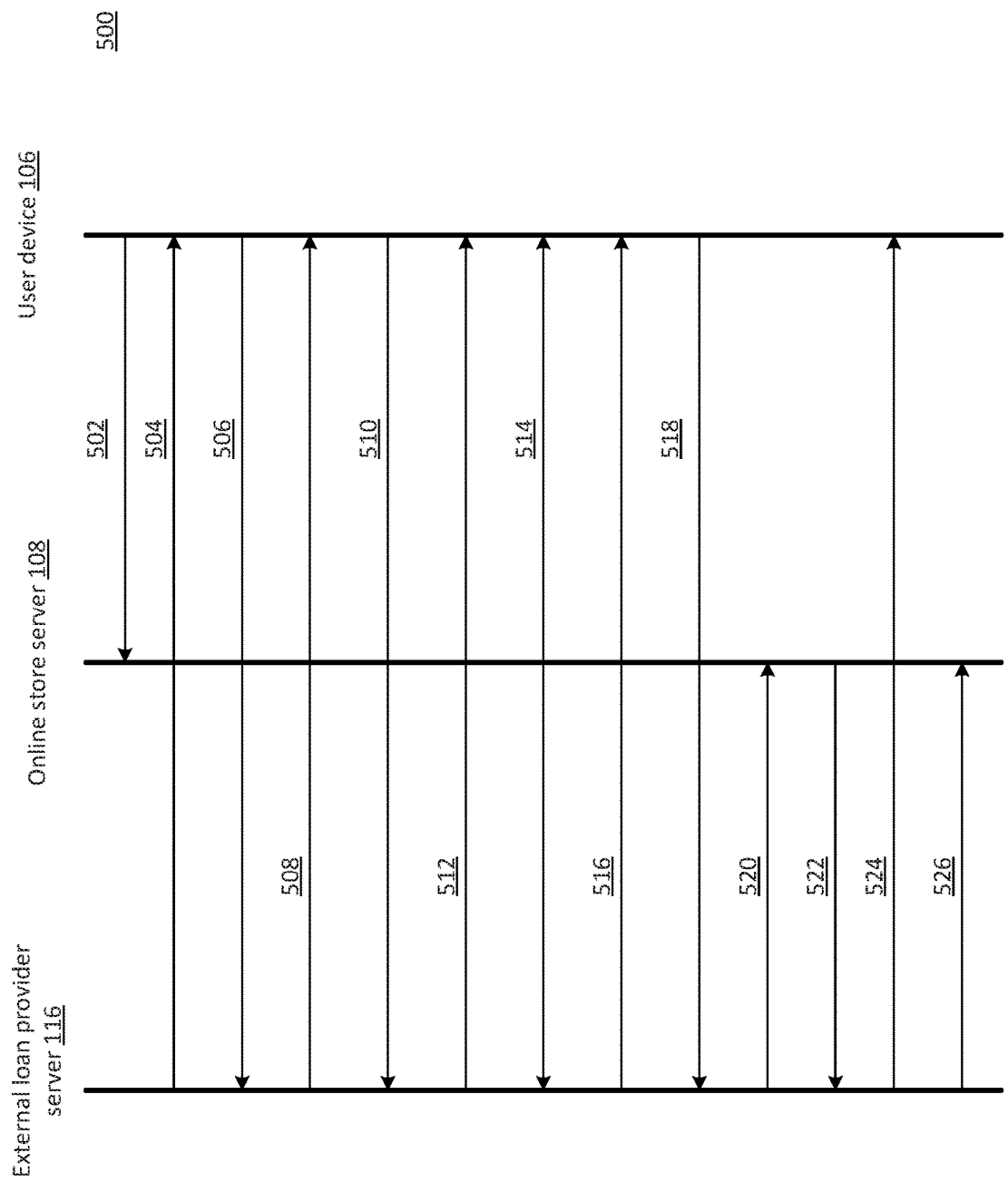
FIG. 5 illustrates a process to generate a loan transaction using an embedded program provided by an external loan provider server according to an implementation of the present disclosure.

FIG. 5 illustrates a process 500 to generate a loan transaction using an embedded program provided by an external loan provider server according to an implementation of the present disclosure. As shown in FIG. 1, user device 106 may run an online store UI 112 that display content supplied by an online store server 108 of an online platform 102. A loan provider server 116 may provide an embedded component 114 integrated in online store UI 112.

At 502, the consumer may use online store UI 112 to access the web pages of the online store supplied by online store server 108. The web pages may include the visual icon associated with embedded component 114 to provide a loan as an option for purchase payment.

At 504, loan provider server 116 may provide embedded component 114 in a receiving element (e.g., an HTML iframe) in content supplied by online store server 108. A consumer may use a user device 106 that runs an online store UI 112 (e.g., a web browser or an App) to access the content. Online store UI 112 may include a visual icon that is associated with embedded component 114. Embedded component 114 may communicate with online store server 108 via a communication channel including application interfaces 110, 120. The communication may be in the form of secure postMessages exchanged between the embedded component 114 and online store UI 112.

At 506, embedded component 114 may, via LSP application interface 110, inquire context information from OSS application interface 120 provided by online store server 108. For example, the inquiry may be transmitted using the postMessage method between embedded component 114 and LSP application interface 110 which may, in turn, communicate with OSS application interface 120. The context information may include what content (e.g., web page) is currently presented in online store UI 112 on user device 106. Responsive to receiving the context information from OSS application 120 via LSP application interfaces 110, embedded component 114 may transmit the context information to loan provider server 116.

At 508, responsive to receiving the context information, loan provider server 116 may determine information to be presented on the visual icon associated with embedded component 114. For example, if the content supplied by online store server 106 is to display a single piece of merchandise at a certain price, loan provider server 116 may calculate an estimated monthly payment for a loan of a certain length (e.g., twelve months). Loan provider server 116 may provide the monthly payment information with the length of the loan (e.g., the number of payments) to embedded component 114. The monthly payment information may be presented on the visual icon, indicating the estimated monthly payment and the length of the loan. In response to the consumer switching to other content displaying another piece of merchandise, loan provider server 116 may receive updated context information about the current content presented on user device 106 and recalculate the monthly payment based on the updated context information. Loan provider server 116 may then provide the updated monthly payment information to embedded component 114 to be presented on the visual icon. The payment information presented on the visual icon helps the consumer decide whether the loan fits his/her budget.

At 510, a consumer may decide to click on the visual icon to select the loan option to pay for the purchase. Responsive to detecting the activation of the visual icon on the consumer device 106, embedded component 114 may generate and send a request to loan provider server 116 to initiate the loan application process. The request may inform loan provider server 116 to start the loan application process.

At 512, responsive to receiving the request from embedded component 114, loan provider server 116 may provide loan application forms to embedded component 114. The loan application forms may include fields to be filled out by the consumer. In one implementation, embedded component 114 may generate a display of the application form within the inline frame (or a pop-up frame) overlaid on top of the underlying content supplied by online store server 108. The generation of the iframe application form does not redirect the underlying content. In one implementation, the presentation of the loan application page may disable other actable elements on the underlying content until the consumer finishes, or exits from, the loan application form.

In one implementation, the loan application may contain multiple stages of content presentation including a stage for personal information and a stage for verifying the identity (e.g., a cell phone number) of the consumer. Thus, at 514, loan provider server 116 may exchange these forms with embedded component 114, and embedded component 114 may collect information using these forms and transmit corresponding information back to loan provider server 116.

Based on information collected from the consumer, loan provider server 116 may determine whether the consumer can be approved for the loan for a purchase. The determination may be based on a risk profile generated in terms of a verification of the consumer's identity and a credit risk profile associated with the identity.

At 516, loan provider server 116 may further close the sale as an agent for online store server 108. For example, loan provider server 116 may further provide content within the inline frame (iframe) or pop-up frame on online store UI 112 informing the consumer that the loan is approved and presenting the term of the loan. The term may include the interest rate and length of the loan. The term may also include the contract terms associated with the loan. The consumer may review and accept the terms associated with loan by selecting an "accept" button in the iframe web page. Upon receiving the acceptance via embedded component 114, loan provider server 116 may further request shipping information.

Upon receiving the shipping address, at 518, embedded component 114 may transmit the shipping address, via LSP application interface 110, to OSS application interface 120 provided by loan provider server 116. At 520, loan provider server 116 may transmit a further request to OSS application interface 120 inquiring about the shipping cost and sales tax.

Responsive to receiving the further request, OSS application interface 120 may determine the shipping cost and sales tax, usually by requesting the information from online store server 108. At 522, OSS application interface 120 may, via LSP application interface 110, send the shipping cost and sales tax to loan provider server 116. Loan provider server 116 may then recalculate the monthly payment to take into consideration the sales tax and shipping cost. At 524, loan provider server 116 may generate a web page within the iframe or pop-up frame in online store UI 112 to inform the consumer of the finalized monthly payments to complete the sale transaction.

Responsive to receiving a confirmation from the consumer, at 526, loan provider server 116 may acquire a transaction token to be associated with the loan transaction. In one implementation, loan provider server 116 may execute a token generator to generate the transaction token. In another implementation, loan provider server 116 may acquire the transaction token from an external token provider. The token may be stored in a secured vault that is accessible by loan provider server 116. In one implementation, only loan provider server 116 has access to the secured vault. The transaction token is stored in association with the particular transaction. One or many transactions may be stored in association with a consumer (e.g., through a consumer identifier). Loan provider server 116 may transmit the transaction token to online store server 108 via communication channel 122 to inform the online store server 108 of the transaction.

Figure 2A:
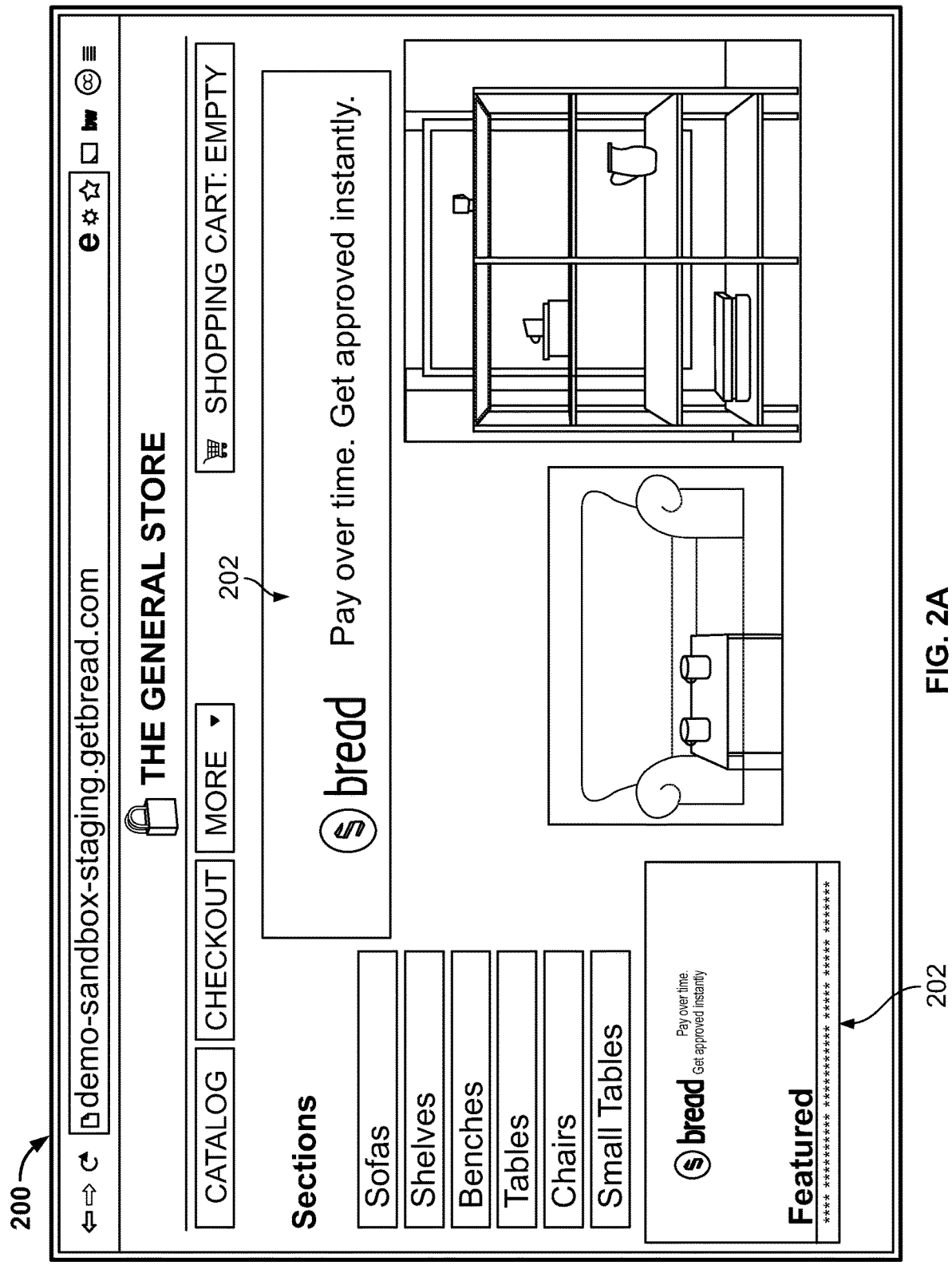

FIGS. 2A-2J show a series of online store web pages presented in an online store UI according to some implementations of the present disclosure. FIG. 2A shows an online store UI 200 for an online store according to an implementation of the present disclosure. The online store UI 200 may be a web browser or an App to receive content (e.g., HTML files) from an online store for a consumer to identify and purchase merchandise. In this particular example, the online store UI 200 is a web page for "The General Sore" to purchase certain furniture. As shown in FIG. 2A, the content of the online store UI 200 may be embedded with one or more visual icons 202 to allow the consumer to apply for a loan to finance a purchase. In one implementation, prior to selecting the financing option, the visual icon 202 (which is a visual representation associated with embedded component 114 as shown in FIG. 1) may be a clickable banner presented on each web page through the consumer's shopping experience. Because the consumer has not decided what to buy, clicking the visual icon 202 may lead the consumer to a pre-qualification process for a loan that, when approved, he or she may later use for online purchase.

Figure 2B:
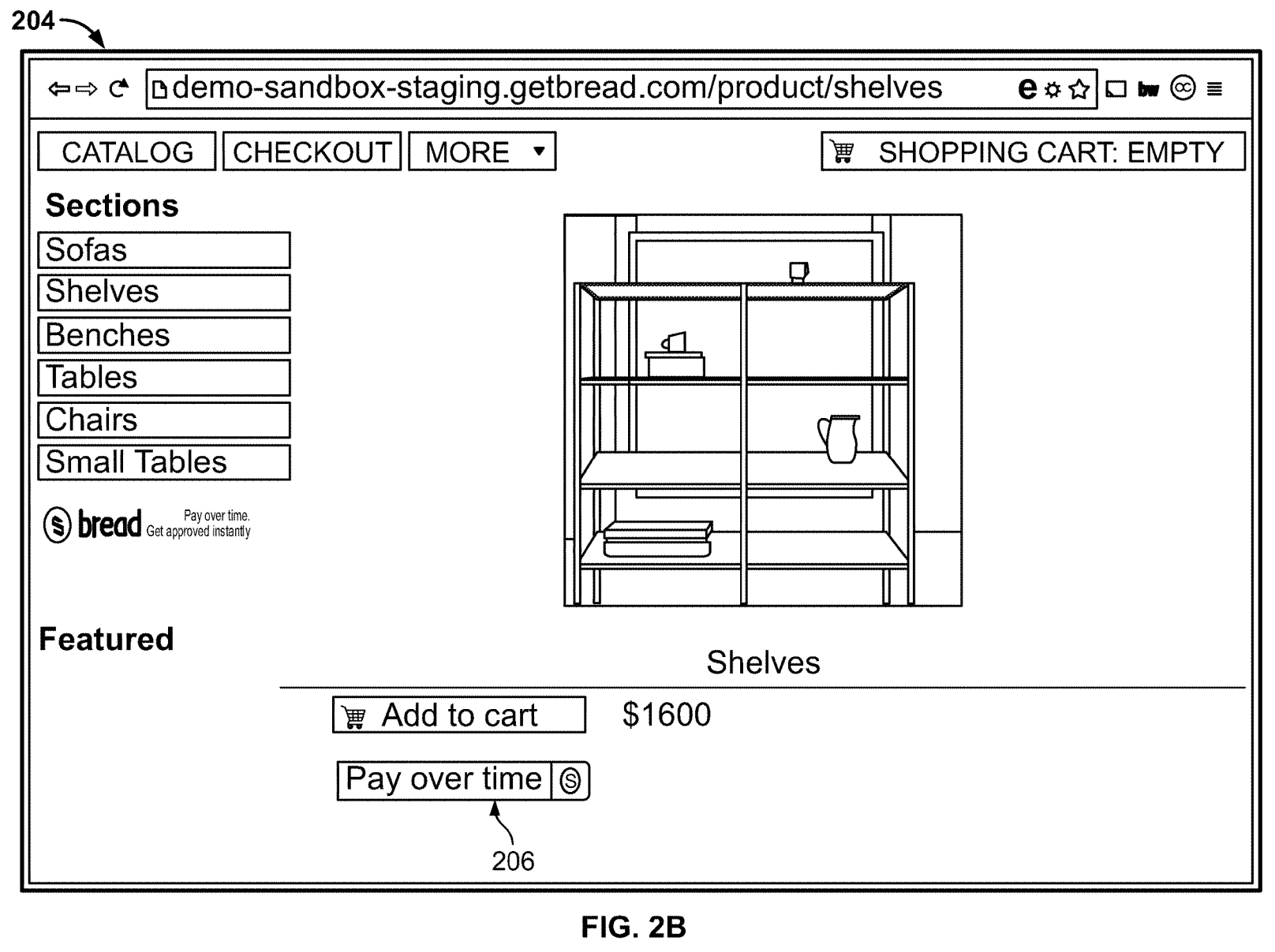

From the online store UI 200 of the online store, the consumer may navigate to a product detail page. FIG. 2B shows a product detail page 204 of the online store according to an implementation of the present disclosure. As shown in FIG. 2B, the consumer may be interested in purchasing a particular merchandise (such as shelves). The product page 204 may provide product description and a purchase price ($1600). The product detail page 204 can also provide an "add to cart" button to allow the consumer to place the item onto a virtual shopping cart. The product detail page 204 may further include a "pay over time" visual icon 206 to provide a loan option to the consumer. The visual icon 206 is associated with an embedded software component supplied by the loan provider server as a third party financing service provider and is hosted in an iframe within the product detail page 204. In this way, the merchant does not need to create user interface logic to move the customer through the application process to apply for a loan.

Figure 2C:
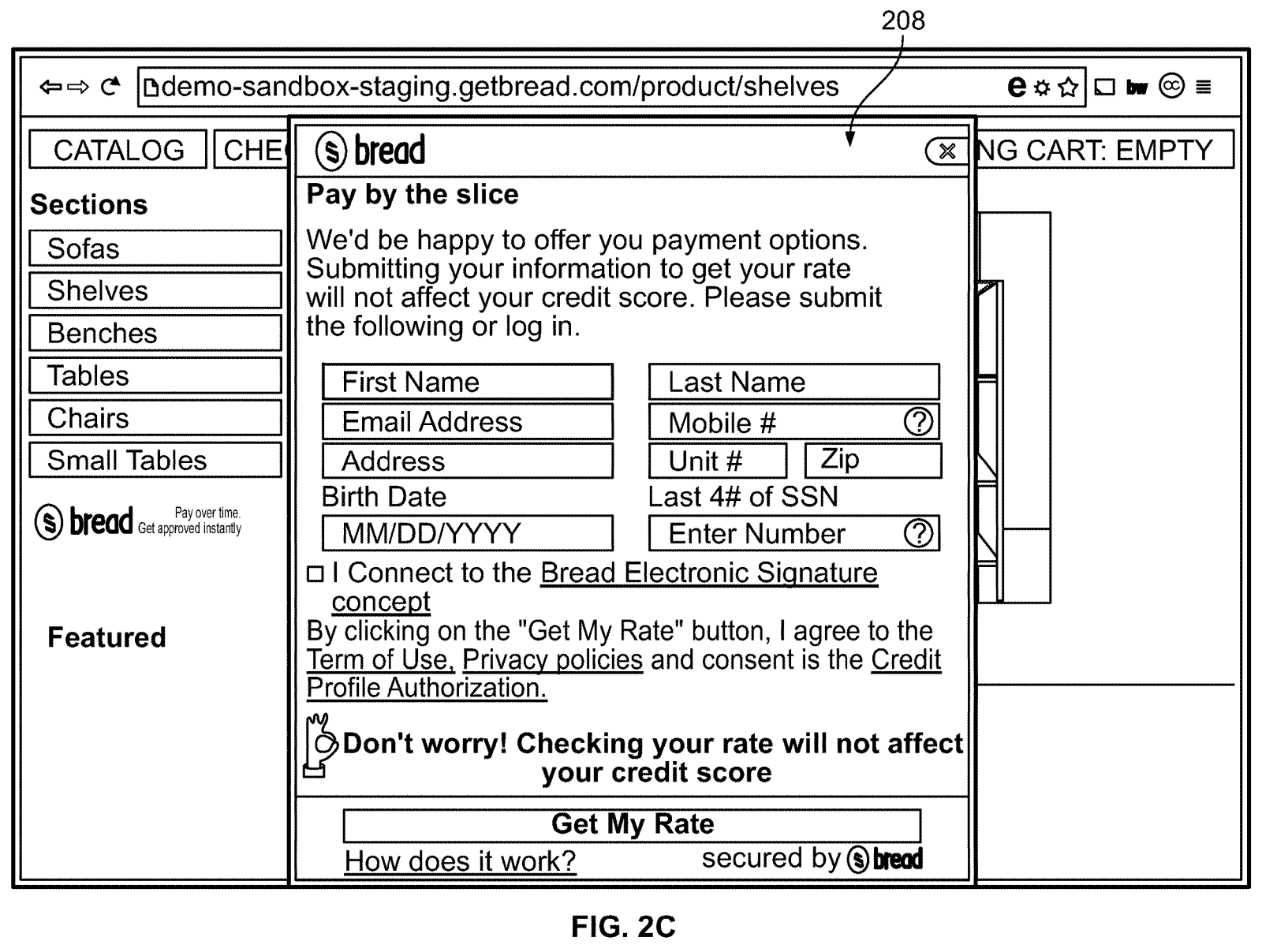

The consumer may click on the visual icon 206 to apply for a loan to purchase the product. This may happen before the consumer engages in the checkout process on the online store. Because the visual icon 206 is a visual representation of the embedded component 114, clicking the visual icon 206 does not change the address in the browser's address bar. Instead, a loan application form may be supplied by the loan provider server overlaid on top of the merchant's page, requesting identification information from the consumer. FIG. 2C shows a loan application form 208 according to an implementation of the disclosure. As shown in FIG. 2C, the loan application form 208 may be supplied by the loan provider server and overlaid on top of the product detail page 204 of the online store. The loan application form 208 may include a number of fields for the consumer to fill out with personal data pertaining to his or her loan application. The personal data may include his or her name, address, birth date, a mobile phone number, and part of or all of his or her social security number. After filing out the form, the consumer may click the "get my rate" button to cause the transmission of these personal data to the loan provider server. The loan provider server and the loan decision engine of the loan provider platform may then perform the steps of identity and credit checks to determine whether the loan service provider is to underwrite the loan. At this stage, the loan provider server may attempt to verify whether the phone number supplied likely belongs to the individual whose identity has been provided in the form. The loan provider server may then, as a further authentication step, send a one-time password (OTP) via short message service (SMS) to the mobile number provided by the consumer, to determine if the consumer attempting to purchase on credit physically possesses that mobile phone device.

Figure 2D:
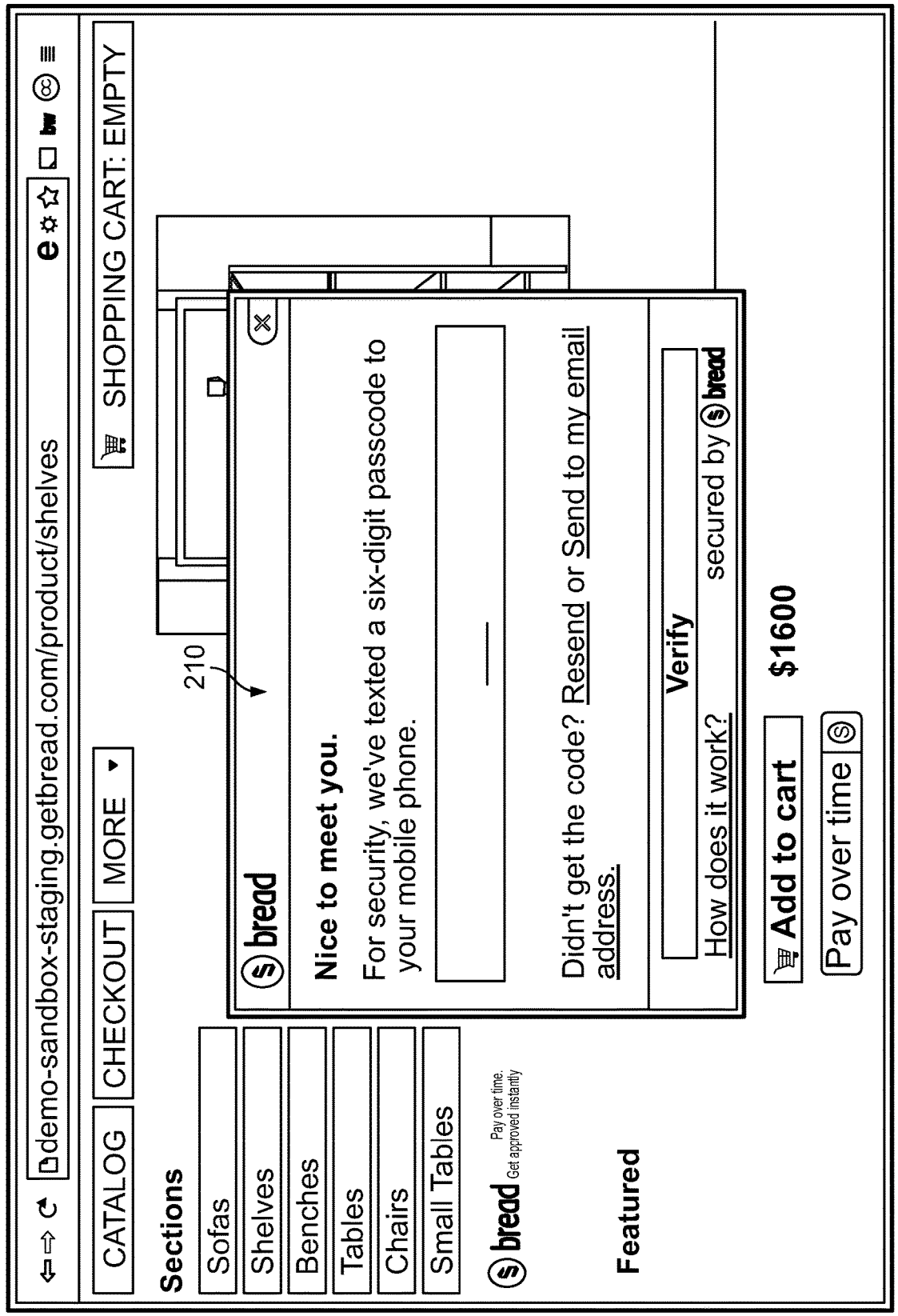

The loan provider server may supply a security verification page and prompt the consumer supply the OTP to prove possession of the mobile device associated with that phone number. FIG. 2D shows a verification page 210 according to an implementation of the present disclosure. The verification page 210 may provide a field for the consumer to fill in the OTP received at his or her mobile phone device. If the consumer successfully supplies the correct OTP, the loan provider server may initiate retrieval of the consumer credit data from one or more external and/or internal credit verification database. The loan decision engine may determine a) whether the consumer applicant is likely trying to obtain credit fraudulently, and b) the credit-worthiness of the applicant. To determine whether the consumer applicant is likely trying to obtain credit fraudulently, the loan decision engine may look at a number of different signals to determine if an application is likely a fraud. Those signals may be related to the order (such as the distance between the billing and shipping addresses, an unusual quantity of a particular item), or related to information about the given addresses (such as a billing address indicating high risk of identity theft such as a nursing home or a prison or a shipping address indicating likelihood of fraud such as a freight forwarding center), or related to technical information about the device used to make the purchase (such as the internet protocol address indicating the purchase was made from a high-risk country or from a point far away from the billing or shipping address, or such as unusual device settings or other technical signals), or related to third-party information (such as fraud alerts on the applicant's credit file; or to other sources and signals). The loan decision engine may look holistically at all of these signals and make a determination either by a set of rules or by a composite score of whether the order is likely a fraudulent attempt to obtain the credit.

If loan decision engine decides that the loan service provider can underwrite the consumer's purchase, the consumer is added as a member of the loan provider's users and a unique identifier associated with the consumer is created. In one implementation, the loan provider server may create a shopping session for this consumer, and return a secure text file called "cookie" to the online store UI to identify the session on subsequent requests to the loan provider server. The loan decision engine may then determine the terms of the loan including monthly payment and length of the loan, and present the full installment plan terms to the user.

Figure 2E:
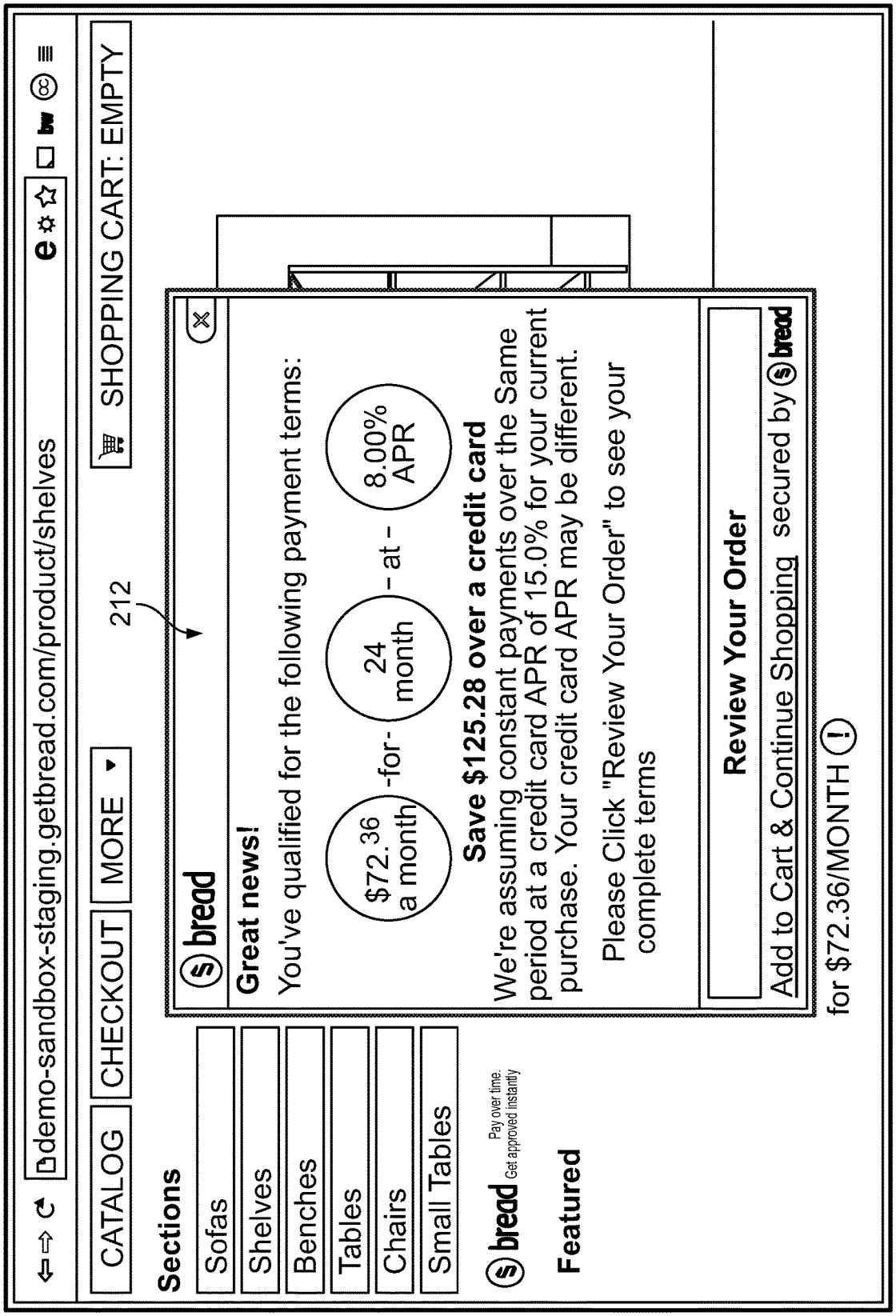

In response to receiving verification of the OTP from the form 210, the loan provider server may provide a loan terms in a form to the consumer. FIG. 2E shows a form 212 including the loan terms according to an implementation of the present disclosure. As shown in FIG. 2E, the form 212 may include the loan terms including an approximate monthly payment ($72.36), a length of the loan (24 months), and an APR (8.00%). The form 212 may be presented as an iframe web page on top of the online store UI. In this example, loan provider server allows sales conversion with an installment payment loan directly from a product detail page. In this illustration, since the consumer entered through the product detail page, and had not gone through the merchant's checkout process, neither the merchant nor the loan provider knows about all the information necessary to complete the order. The information necessary for closing the sale may include the shipping address for the purchase, the sales tax, and shipping options applicable to that address. In one implementation, instead of handing off the sales transaction back to the merchant, the loan provider server may close the sale transaction on behalf of the merchant by collecting shipping information from the consumer through forms hosted in the iframe. The consumer may review the loan terms shown in form 212 and agree to the loan by clicking the "Review Your Order" button presented on form 212.

Figure 2F:
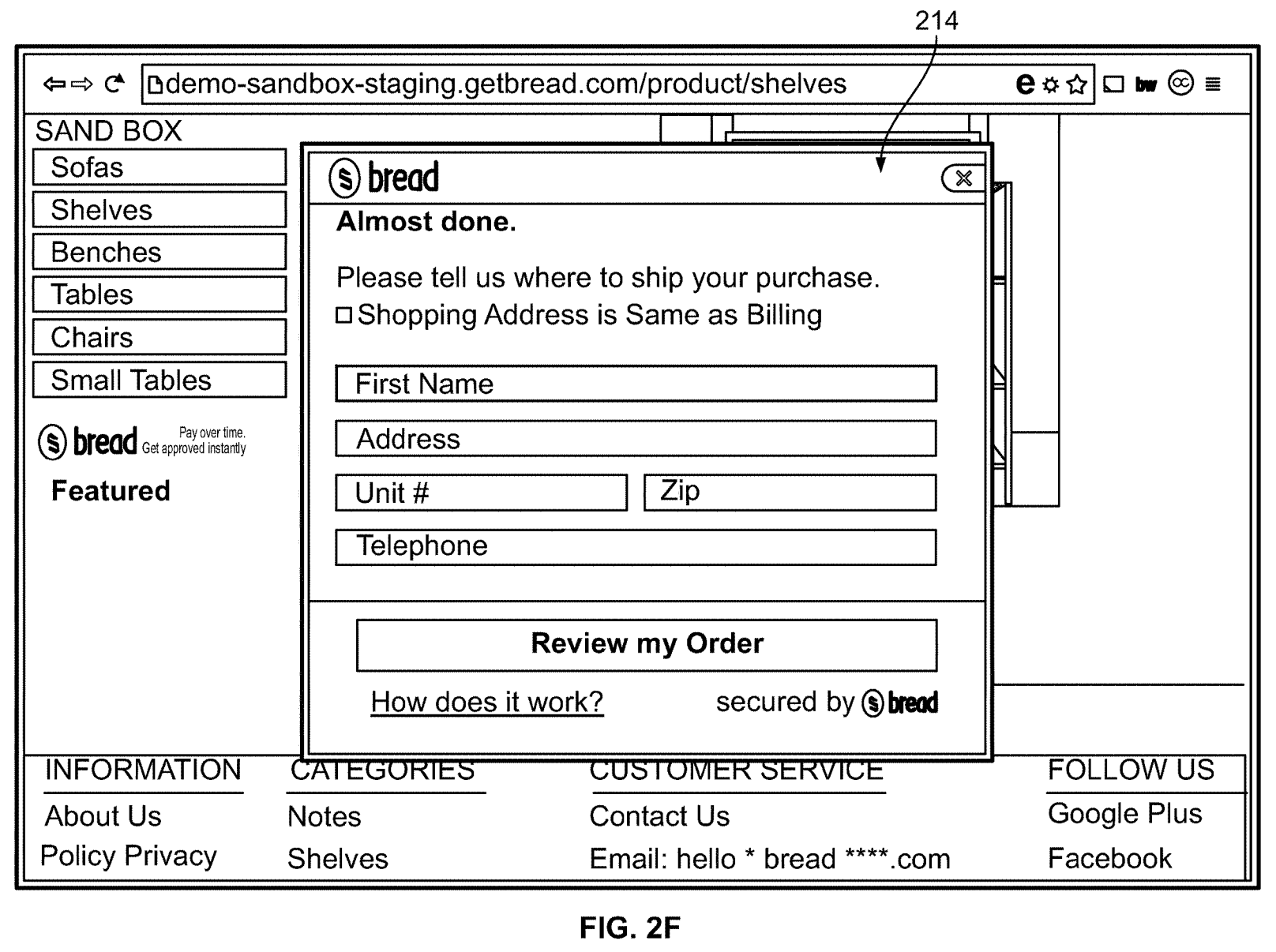

FIG. 2F shows a form 214 for acquiring the shipping information from the consumer according to an implementation of the present disclosure. The loan provider server may supply form 214 overlaid on top of the online store UI. The consumer may fill in the shipping information for the order. The shipping information may determine the shipping cost and sales tax. Before reviewing the order, the loan provider server may pass the shipping address collected for the order to the online store server through the application interfaces 110, 120 (e.g., the JavaScript code) in the online store UI or alternatively through the communication channel 122. This allows the merchant to take the order information along with the shipping address and integrate it with the merchant's logic for sales tax and shipping. The online store server of the merchant may return back to the loan provider server (either directly or indirectly via the OSS application interface 120/the LSP application interface 110) the sales tax and shipping options including costs for the order and the shipping address provided. The loan provider server takes and presents this information to the consumer in a final order review screen, summarizing the order and prices, allowing the consumer to see and select shipping options, restating the final (e.g., updated) terms of the installment plan to the consumer, and allowing the consumer to see and agree to additional consents and agreements.

Figure 2G:
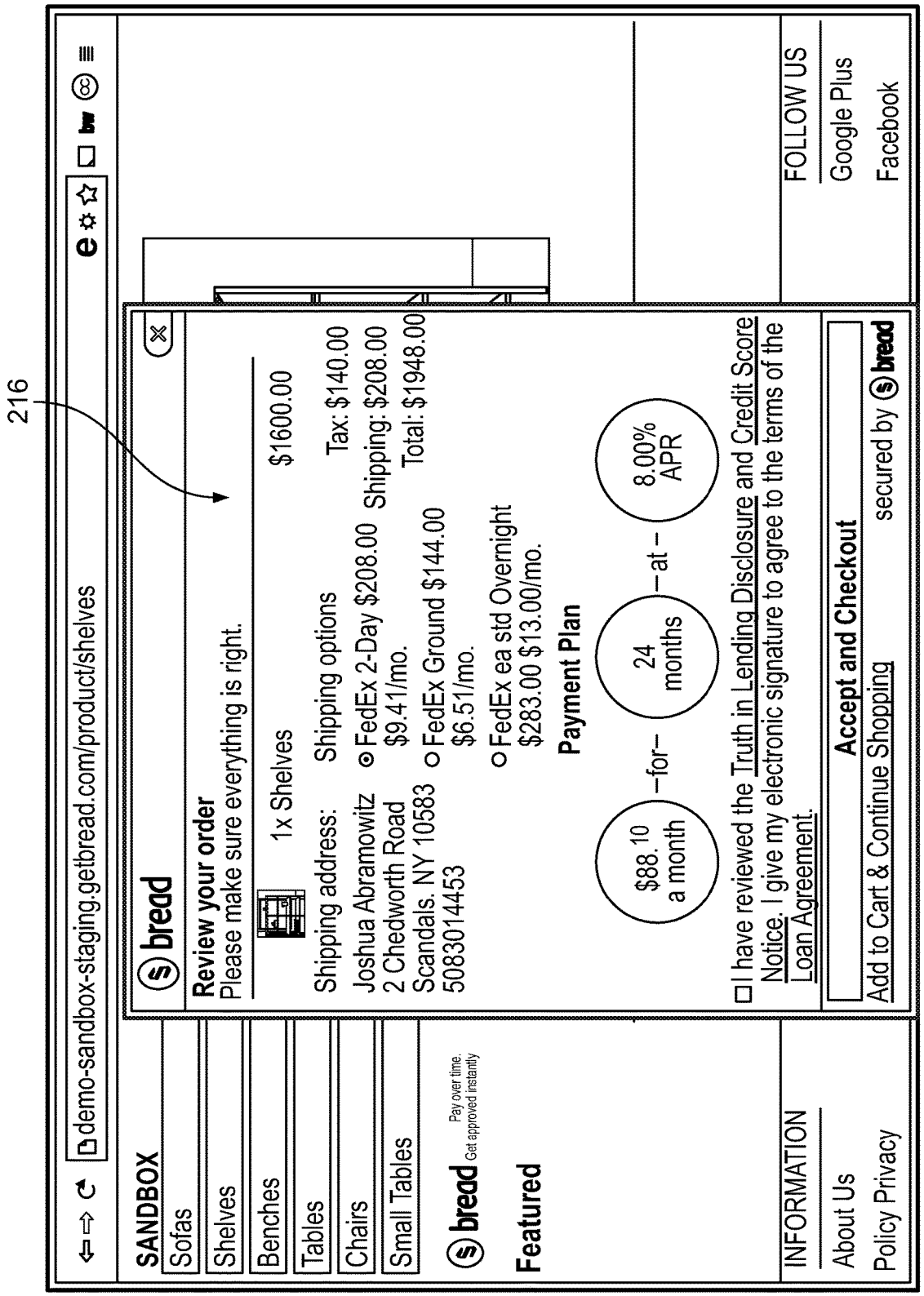

In response to the consumer clicking on the "Review my Order" button on the form 214, the loan provider server may provide the final terms in the iframe. FIG. 2G shows a term sheet 216 according to an implementation of the present disclosure. As shown in FIG. 2G, the loan provider server may provide the term sheet as an overlay in the online store UI. The term sheet 216 may provide an updated payment plan taking into consideration the shipping cost and sales tax. If the consumer accepts the updated term sheet by clicking the "Accept and Checkout" button, the sales transaction is confirmed. In response to receiving the confirmation, the loan provider server may create a token including a unique identifier for the transaction. The loan provider server may return the token to the OSS application interface which may, in turn, transmit the token to the online store server of the merchant. The online store server may request information from the loan provider server about what was provided by the customer into the loan application and checkout process (such as shipping address and selected shipping method). If the merchant determines that everything was successful, the merchant can create an order in its systems and direct the consumer to the merchant's success page which is a webpage presented from the merchant server indicating to the customer that his or her order has been successfully received and is being processed.

Figure 2H:
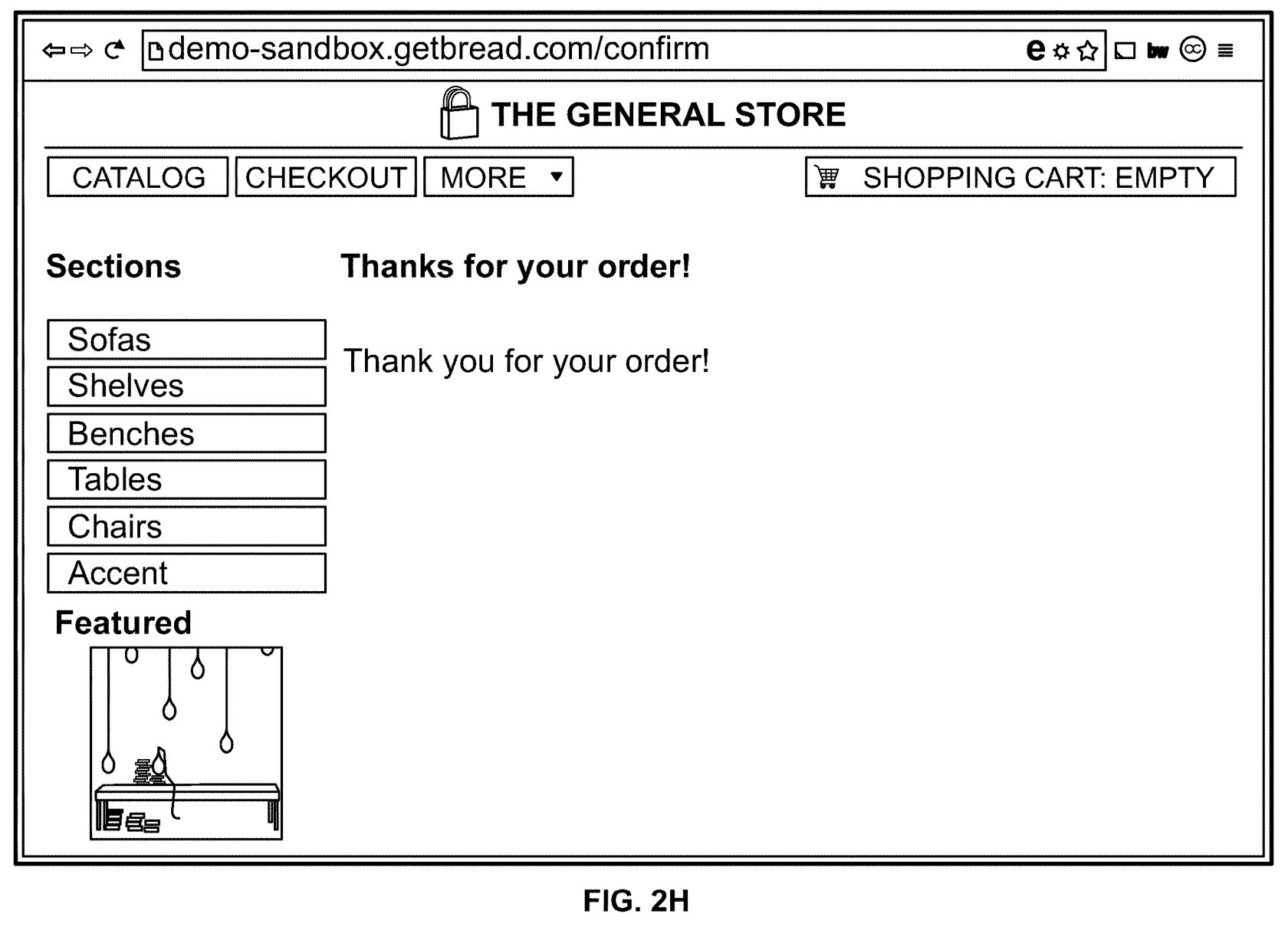

At this stage, the merchant can use the unique identifier to authorize the transaction to the loan provider server. If loan provider server responds with a successful authorization, loan provider has guaranteed the merchant of the full purchase price of the checkout once the order is fulfilled by the merchant. Later, loan provider is responsible for collecting installment payments from the consumer over time. FIG. 2H shows a confirmation page to show that the transaction is successfully completed.

Figure 2I:

In one implementation, the consumer who successfully passes the loan application process becomes a member for the loan provider. In response to making the consumer a member, the loan provider server may update the information presented on the visual to show the projected monthly payment to the consumer throughout the shopping experience. The monthly payment may be specific to the context of where the visual icon is placed (whether a particular product or a shopping cart of multiple products), as well as the specific credit terms assigned to that particular consumer. For example, on another product page showing another product, the visual icon may show the specific dollars per month to purchase that product. If the consumer adds multiple items and proceeds through the merchant's standard shopping cart, the visual icon can show dollars per month for the entire shopping cart. FIG. 2I shows product detail page for a member according to an implementation of the present disclosure. As shown in FIG. 2I, the visual icon 218 (which is associated with embedded component 114 in FIG. 1) is the approximate monthly payment ($76.07) with respect to the product that the product (shelves) shown on the product detail page. When the consumer switches to another product page (e.g., a sofa page), the monthly payment updates accordingly to reflect the monthly payment for that product.

Figure 2J:
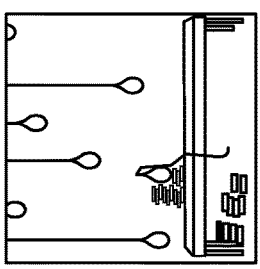

In the background, every time the visual icon is to appear on the online store UI, the iframe within the online store UI may make a request, to loan provider server, with the display information, including items and total price. The loan provider server may use the "cookie" that accompanies the request to identify the session and the associated credit terms, and to compute the price for the goods in the icon's current context. FIG. 2J shows the visual icon 220 displaying the monthly payment for a total purchase of a shopping cart.

Figure 3:
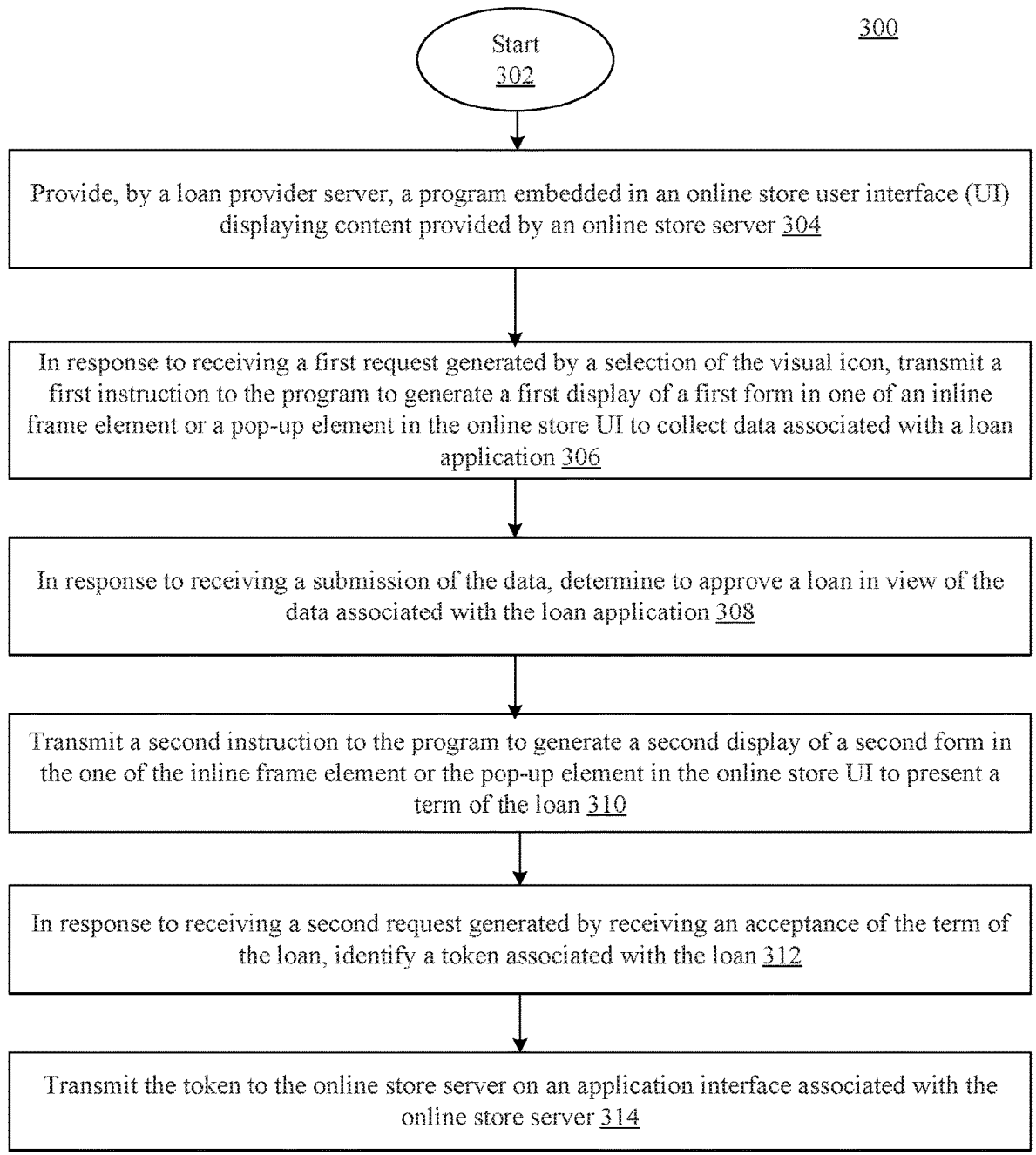
FIG. 3 is a flow diagram illustrating a method to provide a context-aware visual icon using a loan provider server according to an implementation of the present disclosure.

FIG. 3 is a flow diagram illustrating a method 300 to provide a context-aware visual icon by a loan provider server according to an implementation of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by the loan provider server 116 as shown in FIG. 1.

Referring to FIG. 3, at 302, operations may start. At 304, the loan provider server may provide a program embedded in an online store user interface (UI) such as, for example, a web browser or an App interface, displaying content provided by an online store server. The program is associated with a visual icon presented on the online store UI. The visual icon can be any suitable form of graphical user interface elements such as, for example, a graphical button. In one implementation, the visual icon may be presented in an inline frame element or a pop-up element provided by the loan provider server. In another implementation, the visual icon can be provided by the online store server on the online store UI.

At 306, the loan provider server may, in response to receiving a first request generated by a selection of the visual icon, transmit a first instruction to the program to generate a first display of a first form in the one of the inline frame element or the pop-up element in the online store UI to collect data associated with a loan application. When the visual icon is provided by the online store server, in response to the selection of the visual icon, the online store server may transmit a notification to OSS application interface 120 to notify the selection. OSS application interface 120 may forward the notification to LSP application 110 which may, in turn, to notify embedded component 114 about the selection of the visual icon. If the visual icon is provided by loan provider server 116, the loan provider server may receive a notification of the selection of the visual icon directly from embedded component 114.

At 308, the loan provider server may, in response to receiving a submission of the data, determine to approve a loan in view of the data associated with the loan application.

At 310, the loan provider server may transmit a second instruction to the program to generate a second display of a second form in the one of the inline frame element or the pop-up element in the online store UI to present a term of the loan.

At 312, the loan provider server may, in response to receiving a second request generated by receiving an acceptance of the term of the loan, identify a token uniquely associated with the loan, whereas the identification of the token may include generating the token by the loan provider server or receiving the token from a third-party token provider.

At 314, the loan provider server may transmit the token to the online store server or an application interface associated with the online store server.

Figure 4:
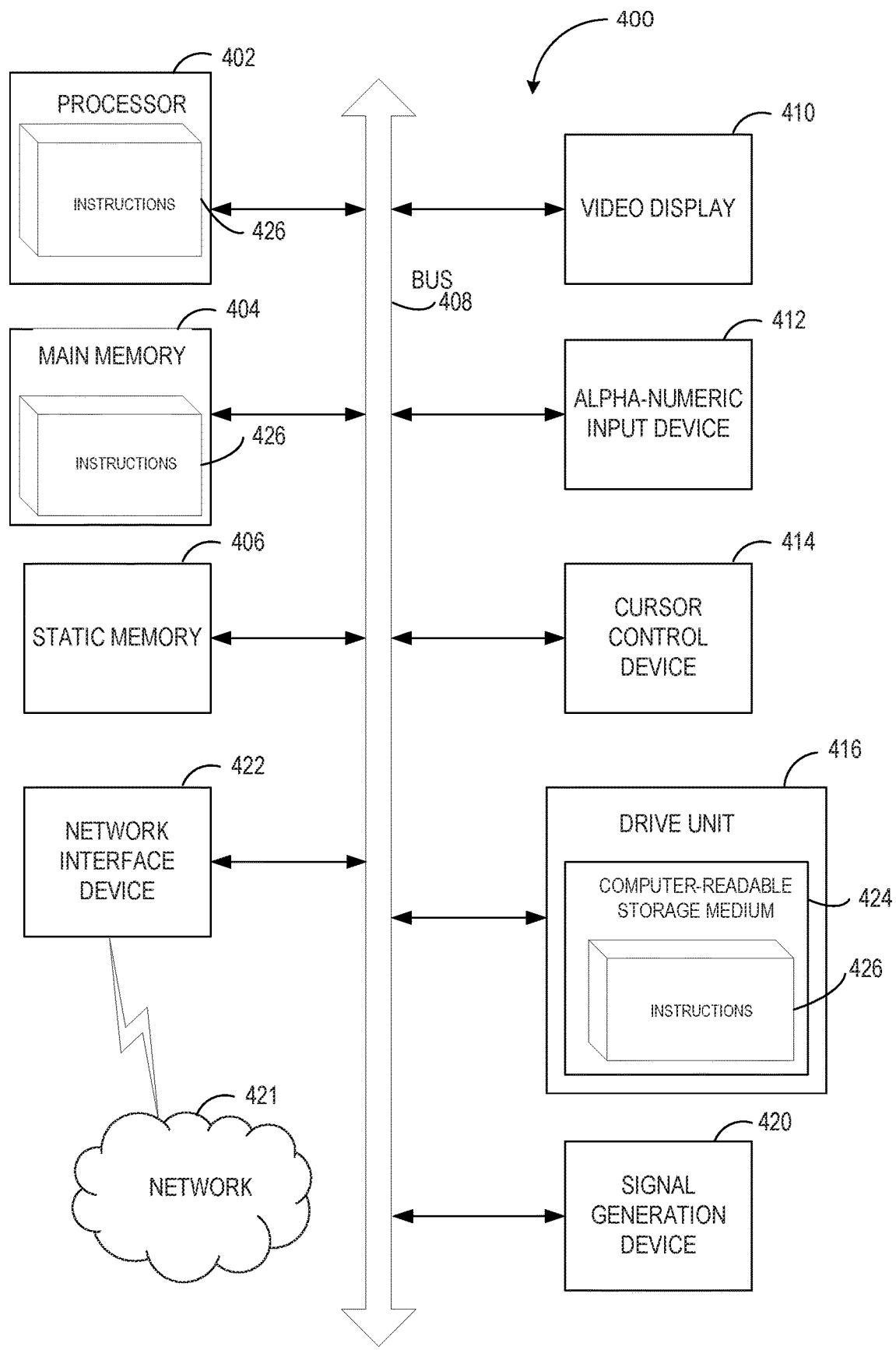
FIG. 4 is a block diagram illustrating an exemplary computer system, according to some implementations of the present disclosure.

FIG. 4 illustrates a diagrammatic representation of a machine in the exemplary form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 (which can be the user device 106) includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions 426 (e.g., software) embodying any one or more of the methodologies or functions described herein (e.g., instructions of the loan provider server 116). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 421 via the network interface device 422.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

Reference throughout this specification to "one implementation," "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   providing, by a processing device, an embedded program executable via an icon provided in one or more pages displayed by a user interface displaying content associated with an item available for purchase via a transaction platform associated with a merchant;
   in response to an interaction with the icon, transmitting a first instruction to the embedded program to generate a first display of a first form in one of an inline frame element or a pop-up element of the user interface to collect data associated with a loan application associated with a transaction corresponding to the item;
   in response to receiving a submission of the data associated with the loan application, determining, by a loan provider system, to approve a loan associated with the item;
   transmitting a second instruction to the embedded program to generate a second display of a second form in one of the inline frame element or the pop-up element of in the user interface to present one or more terms of the loan associated with the item;
   in response to an acceptance of the one or more terms of the loan, generating a token comprising an identifier corresponding to the loan and the transaction;
   transmitting the token to the transaction platform, wherein the token is processed by the transaction platform to enable completion of the transaction; and
   receiving, from the transaction platform, a communication comprising the token identifying the loan and the transaction.

2. The method of claim 1, wherein the one or more pages comprises at least one of a product detail page, a shopping cart overview page, or a checkout page.

3. A system comprising:
   a memory to store instructions, and
   a processing device, operatively coupled to the memory, the processing device to execute the instructions to:
   provide a program to be embedded in an online store user interface (UI) displaying content associated with a merchandise item available for purchase via a transaction platform provided by an online store server, wherein the program is associated with a visual icon presented via the online store UI, and wherein the online store user interface comprises one or more pages comprising at least one of a product detail page, a shopping cart overview page, or a checkout page;
   in response to receiving a first request generated by a selection of the visual icon, transmit a first instruction to the program to generate a first display of a first form in one of an inline frame element or a pop-up element in the online store UI to collect data associated with a loan application associated with a transaction corresponding to the merchandise item; and
   in response to receiving a submission of the data associated with the loan application, determine to approve a loan associated with the merchandise item in view of the data associated with the loan application;
   transmit a second instruction to the program to generate a second display of a second form in the one of the inline frame element or the pop-up element in the online store UI to present a term of the loan associated with the merchandise item;
   in response to receiving a second request generated by receiving an acceptance of the term of the loan, generate a token comprising an identifier corresponding to the loan and the transaction; and
   transmit the token to one of the online store server or an application interface associated with the online store server, wherein the token is processed to enable completion of the transaction.

4. The system of claim 3, wherein the program comprises an application programming interface (API) function call configured to be invoked via the online store UI.

5. The system of claim 3, wherein the visual icon comprises a graphic element.

6. The system of claim 3, wherein selection of the visual icon comprises an engagement with the visual icon executed via a user device.

7. The system of claim 3, wherein the first form is displayed via the online store UI without redirecting a user device to a different online address.

8. The system of claim 3, the processing device to execute the instructions to store an association between the token and the transaction.

9. The system of claim 8, the processing device to execute the instructions to perform an action using the association between the token and the transaction, wherein the action comprises at least one of a payment operation or a refund operation.

10. A non-transitory computer readable medium comprising instructions, which when executed by a processing device, cause the processing device to perform operations comprising:
    providing an embedded program executable via an icon provided in one or more pages displayed by a user interface comprising content associated with an item available for purchase via a transaction platform associated with a merchant;
    in response to an interaction with the icon, transmitting a first instruction to the embedded program to generate a first display of a first form in one of an inline frame element or a pop-up element of the user interface to collect data associated with a loan application associated with a transaction corresponding to the item;
    in response to receiving a submission of the data associated with the loan application, determining, by a loan provider system, to approve a loan associated with the item;

transmitting a second instruction to the embedded program to generate a second display of a second form in one of the inline frame element or the pop-up element of in the user interface to present one or more terms of the loan associated with the item;

in response to an acceptance of the one or more terms of the loan, generating a token comprising an identifier corresponding to the loan and the transaction;

transmitting the token to the transaction platform, wherein the token is processed by the transaction platform to enable completion of the transaction; and receiving, from the transaction platform, a communication comprising the token identifying the loan and the transaction.

11. The non-transitory computer readable medium of claim 10, wherein the embedded program comprises an application programming interface (API) function call configured to be invoked via an online store UI.

12. The non-transitory computer readable medium of claim 10, wherein the icon comprises a graphic element.

13. The non-transitory computer readable medium of claim 10, wherein selection of the icon comprises an engagement with the icon executed via a user device.

14. The non-transitory computer readable medium of claim 10, wherein the first form is displayed via an online store UI without redirecting a user device to a different online address.

15. The non-transitory computer readable medium of claim 10, the operations further comprising storing an association between the token and the transaction.

16. The non-transitory computer readable medium of claim 15, the operations further comprising performing an action using the association between the token and the transaction, wherein the action comprises at least one of a payment operation or a refund operation.

17. The non-transitory computer readable medium of claim 10, wherein the one or more pages comprises at least one of a product detail page, a shopping cart overview page, or a checkout page.

* * * * *